US012657062B2

(12) United States Patent
Lee et al.

(10) Patent No.: US 12,657,062 B2
(45) Date of Patent: Jun. 16, 2026

(54) RESOURCE BALANCING FOR WORKLOAD MANAGEMENT IN NETWORKED SYSTEMS

(71) Applicant: Wells Fargo Bank, N.A., San Francisco, CA (US)

(72) Inventors: Asheley Shawn Lee, Collegeville, PA (US); Ryan Linn, Raleigh, NC (US); Patrick Kelly O'Donnell, Denver, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 567 days.

(21) Appl. No.: 18/319,937

(22) Filed: May 18, 2023

(65) Prior Publication Data
US 2024/0385888 A1 Nov. 21, 2024

(51) Int. Cl.
G06F 9/46 (2006.01)
G06F 9/50 (2006.01)

(52) U.S. Cl.
CPC .......... G06F 9/5038 (2013.01); G06F 9/5016 (2013.01); G06F 9/505 (2013.01)

(58) Field of Classification Search
CPC ....... G06F 9/5038; G06F 9/5016; G06F 9/505
See application file for complete search history.

(56) References Cited

U.S. PATENT DOCUMENTS 6,976,053 B1    12/2005  Tripp et al.
9,379,933 B1 *  6/2016   Bishop .................. H04L 65/612

2008/0046895 A1 *  2/2008  Dillenberger ........... G06F 9/505
                                                                718/105
2010/0005072 A1    1/2010  Pitts
2015/0074259 A1    3/2015  Ansari et al.
2015/0288655 A1 * 10/2015  Narasimhamurthy ......................
                                                            H04L 45/7453
                                                                 370/475
2018/0300174 A1 * 10/2018  Karanasos ............ G06F 9/4881
2024/0248788 A1 *  7/2024  Soumpholphakdy ......................
                                                            G06F 11/0793

FOREIGN PATENT DOCUMENTS

WO          9944123 A1    9/1999
WO       2017127850 A1    1/2017

* cited by examiner

*Primary Examiner* — Gregory A Kessler

(74) *Attorney, Agent, or Firm* — Merchant & Gould P.C.

(57)          ABSTRACT

An application management system using Remote Procedure Call (RPC) frameworks can easily consume excessive amounts of memory or other resources. As described herein, tasks are allocated and balanced amongst engines using a small or fixed size of volatile memory. The memory used in such systems can balance tasks or jobs between different engines by allocating tasks between engine task lists. The complete details of those tasks are stored in queues in non-volatile memory. Tasks are allocated among the lists using a set of rules for new work, pinned work, work from disconnected engines, and reallocated work. The quantity of volatile memory and other resources necessary to manage the RPC framework is thereby reduced, or can even be handled within a size of volatile memory fixed by the user.

18 Claims, 7 Drawing Sheets

RESOURCE BALANCING FOR WORKLOAD MANAGEMENT IN NETWORKED SYSTEMS

BACKGROUND

Remote Procedure Call (RPC) frameworks can be used for building distributed systems in which components or services are located on different machines and communicate with each other over a network. RPC allows clients to call methods or procedures on a remote server as if they were local, abstracting away the network communication details. RPC frameworks provide a standardized way of defining remote services, specifying their interfaces, and generating the necessary code for clients to interact with them.

RPC frameworks are used in a variety of applications, including microservices architectures, cloud computing, and distributed systems. They facilitate scaling of services independently, allowing developers to add or remove services as necessary without affecting the rest of the system. Some popular RPC frameworks include the gRPC framework, Apache Thrift, and Apache Avro.

gRPC in particular has gained traction because it is fast and efficient, especially when used in microservices architectures. gRPC can handle even large sets of data, worklists, and queues, but these large data sets cause correspondingly high demands on gRPC's use of volatile memory.

SUMMARY

In a first aspect, an application management device for indexing remote data stores is described. The application management device includes a cache comprising volatile memory and configured to store a plurality of tasks. The application management device further includes a non-volatile memory configured to store a plurality of queues, each of the plurality of tasks corresponding to one of the plurality of queues. A processor is communicatively coupled to a plurality of engines, and can assign the plurality of tasks to a set of engine task lists. Each of the set of engine task lists corresponds to one of the plurality of engines. The processor can assign each of a plurality of new tasks to an engine task list of the set of engine task lists, wherein each of the plurality of new tasks is assigned based upon which of the set of engine task lists has fewest assigned tasks. The processor can also assign each of a plurality of tasks from disconnected engines to an engine task list of the set of engine task lists, wherein each of the plurality of tasks from disconnected engines is assigned based upon which of the engine task lists has fewest assigned tasks. The processor can also rebalance the plurality of tasks amongst the set of engine task lists.

According to another aspect, a method includes assigning a plurality of tasks to a set of engine task lists, wherein each of the set of engine task lists corresponds to one of the plurality of engines. The method further includes assigning each of a plurality of new tasks to an engine task list of the set of engine task lists, wherein each of the plurality of new tasks is assigned based upon which of the set of engine task lists has fewest assigned tasks. The method further includes assigning each of a plurality of tasks from disconnected engines to an engine task list of the set of engine task lists, wherein each of the plurality of tasks from disconnected engines is assigned based upon which of the engine task lists has fewest assigned tasks. The method further includes rebalancing the plurality of tasks amongst the set of engine task lists, wherein each of the plurality of tasks corresponds to a queue stored in a non-volatile memory, and wherein the plurality of tasks are stored in a cache comprising volatile memory.

According to another aspect, a system for indexing remote data stores is described. The system includes a plurality of engines and an application management device. The application management device includes a cache comprising volatile memory and configured to store a plurality of tasks; a non-volatile memory configured to store a plurality of queues, each of the plurality of tasks corresponding to one of the plurality of queues; and a processor. The processor is communicatively coupled to the plurality of engines, and configured to assign the plurality of tasks to a set of engine task lists, wherein each of the set of engine task lists corresponds to one of the plurality of engines. The processor is also configured to assign each of a plurality of new tasks to an engine task list of the set of engine task lists, wherein each of the plurality of new tasks is assigned based upon which of the set of engine task lists has fewest assigned tasks. The processor is also configured to assign each of a plurality of tasks from disconnected engines to an engine task list of the set of engine task lists, wherein each of the plurality of tasks from disconnected engines is assigned based upon which of the engine task lists has fewest assigned tasks. The processor is also configured to rebalance the plurality of tasks amongst the set of engine task lists.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
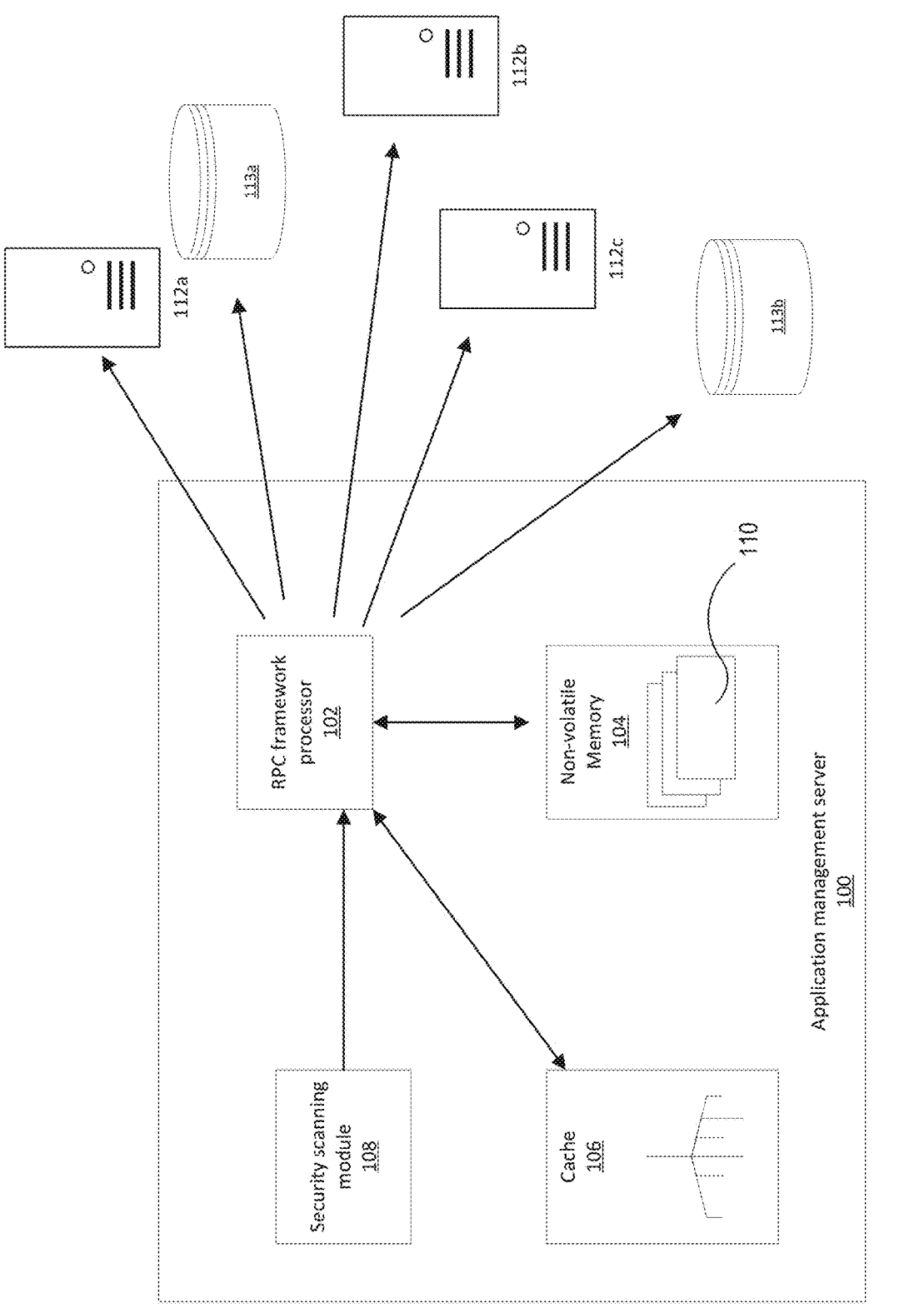
FIG. 1 depicts an application management server and a set of associated remote computing engines and spaces.

Remote Procedure Call (RPC) frameworks have grown in popularity as tasks are carried out by remote servers of different types at different locations. With increased data set sizes, the handling of various work queues and allocation of tasks to engines can be handled quickly. However, the tradeoff is that on conventional RPC systems these larger data set sizes require ever-higher memory usage. The conventional approach, in which speed is the primary objective while volatile memory usage is a secondary concern, has limitations as lists for processing become ever larger.

Additionally, in modern systems the time it takes to complete a task is often a function of both calls to the memory and of network latency. Because network latency can be in the range of seconds, it has been recognized that enhancements in memory calls (which can be on the order of milliseconds) are inconsequential. Therefore, it has been recognized that use of non-volatile memory for some aspects of an RPC infrastructure will lead to inconsequential increases in time to complete a set of tasks.

In other words, it has been recognized that as data lists become larger, and as more parts of the infrastructure used to complete tasks using an RPC framework involve network latency delays, it is more computationally efficient to use less volatile memory and ignore the time losses associated with calling to that non-volatile memory. List management is increasingly required for lists that include locations of files throughout a large number of servers in an RPC system or framework. In some instances, a list can reference millions of files, so management of the list as the files are indexed can be resource-intensive.

Throughout this application, terms are used that have specific meanings within the context of computer-implemented technologies. For clarity, several such terms that are used in the application have specific meanings as set out below.

First, the term "engine" as used throughout this application refers to a generic work handler. In an RPC system, engines can be either general purpose or special purpose computers or servers. For example, in some RPC systems an engine may be suited for a type of task, either due to its geographical location, its design and capabilities, or some other criterion. Tasks may be assigned to specific engines that are particularly suitable or required for those tasks. Such tasks and their associated engines are referred to as being "pinned". Other tasks may be suitable for completion by any engine that is available.

Queues are data structures that hold requests from clients waiting to be processed. When a client sends a request to the server, the request is added to the queue. Conventionally, the server then processes requests from the queue one by one in the order they were received, typically using a first-in-first-out approach. RPC frameworks using queues facilitate handling of requests from multiple clients concurrently, even if the requests arrive at the same time, preventing resource contention and improving system stability by allowing the server to manage its workload efficiently. A queue can identify a server that has files that should be processed.

To address the issues described above related to the balancing of volatile memory use against speed of processing, a volatile memory cache is used that can be manipulated to balance performance with resources. An optimized protocol that allows for the indexing of the files is used, and an RPC framework processor acts as a list manager that manages the lists of files that are stored in each of the spaces. "Spaces" as used herein can refer to servers, datacenters, or other data storage resources that can be accessed by the application management server.

FIG. 1 shows one such application management server 100, which includes an RPC framework processor 102, a non-volatile memory 104, a cache 106, and a security scanning module 108. The non-volatile memory 104 stores a set of queues 110.

Application management server 100 is communicatively coupled to a plurality of engines 112a-112c, as well as a plurality of spaces 113a-113b. While only three engines 112a, 112b, and 112c are shown, as well as only two spaces 113a and 113b, it should be understood that this simplified schematic is limited for clarity of depiction and that in practice there may be a large number of both of these components. In a typical RPC framework, application management server 100 may be coupled to thousands or tens of thousands of engines like those shown in FIG. 1 as engines 112a-112c. Similarly, an application managements server 100 may be coupled to thousands or tens of thousands of spaces like those shown in FIG. 1 as spaces 113a and 113b.

Application management server 100 carries out the core functions of an RPC framework. For example, RPC framework processor communicates to each of the engines (112a-112c) and spaces (113a and 113b) based on information stored in the non-volatile memory 104 and the cache 106. Application management server 100 may also include a security scanning module 108 that analyzes data and processes carried out by the RPC framework processor 102.

Cache 106 maintains a set of tasks to be completed by the RPC system. In one embodiment, cache 106 stores such tasks in a self-balancing tree construct, as depicted in FIG. 1. Cache 106 receives new tasks, clears completed tasks, and reallocates tasks from engines (e.g., 112a-112c) that have a larger number of tasks to complete to engines (e.g., others of 112a-112c) that have relatively fewer tasks to complete. Cache 106 can be contained in volatile memory having a fixed or predefined size. Cache 106 updates the workload assignments of engines (112a-112c) and their corresponding queues 110 using those allocated resources. The amount of memory provided for cache 106 will affect the speed at which the queues are updated, added, removed, or reallocated, and can be increased or decreased in order to balance requirements by the operator of the system.

Cache 106 can be sized, re-sized, or adjusted to balance speed against volatile memory usage. Such adjustments can be made manually, such as when a user wishes to increase the speed of operation of application management server 100, or in some instances the size adjustments can be made automatically when it is determined that the allocated or fixed cache size is insufficient.

In contrast to conventional RPC frameworks, queues 110 are stored within non-volatile memory 104. Queues contain tasks, references to locations were data are stored (e.g., a particular one of the spaces 113a and 113b), and other information necessary to conduct specific tasks that are to be handled by the application management server 100.

Engines 112a-112c, as mentioned briefly previously, are a set of distributed workload handlers, such as servers or processors. Engines 112a-112c can be CPU-bound workload handlers, input/output (I/O)-bound handlers, memory-bound workload handlers, network-bound workload handlers, or some combination thereof. Engines 112a-112c can go online or offline as resources are allocated, deallocated, or experience failures or go back online, such that there may be some change in the engines (e.g., engines 112a-112c) that are available and in communication with RPC framework processor 102 at any given time.

Spaces 113a and 113b are repositories of data that may be used, either directly by RPC framework processor 102 or more typically by engines 112a-112c. Mappings between engines 112a-112c and spaces 113a and 113b are defined in the queues 110 stored in the non-volatile memory 104. Those mappings are updated by RPC framework processor 102 based on the self-balancing tree within cache 106, as well as rules for allocating and reallocating tasks as described in more detail with respect to FIG. 2.

Figure 2:
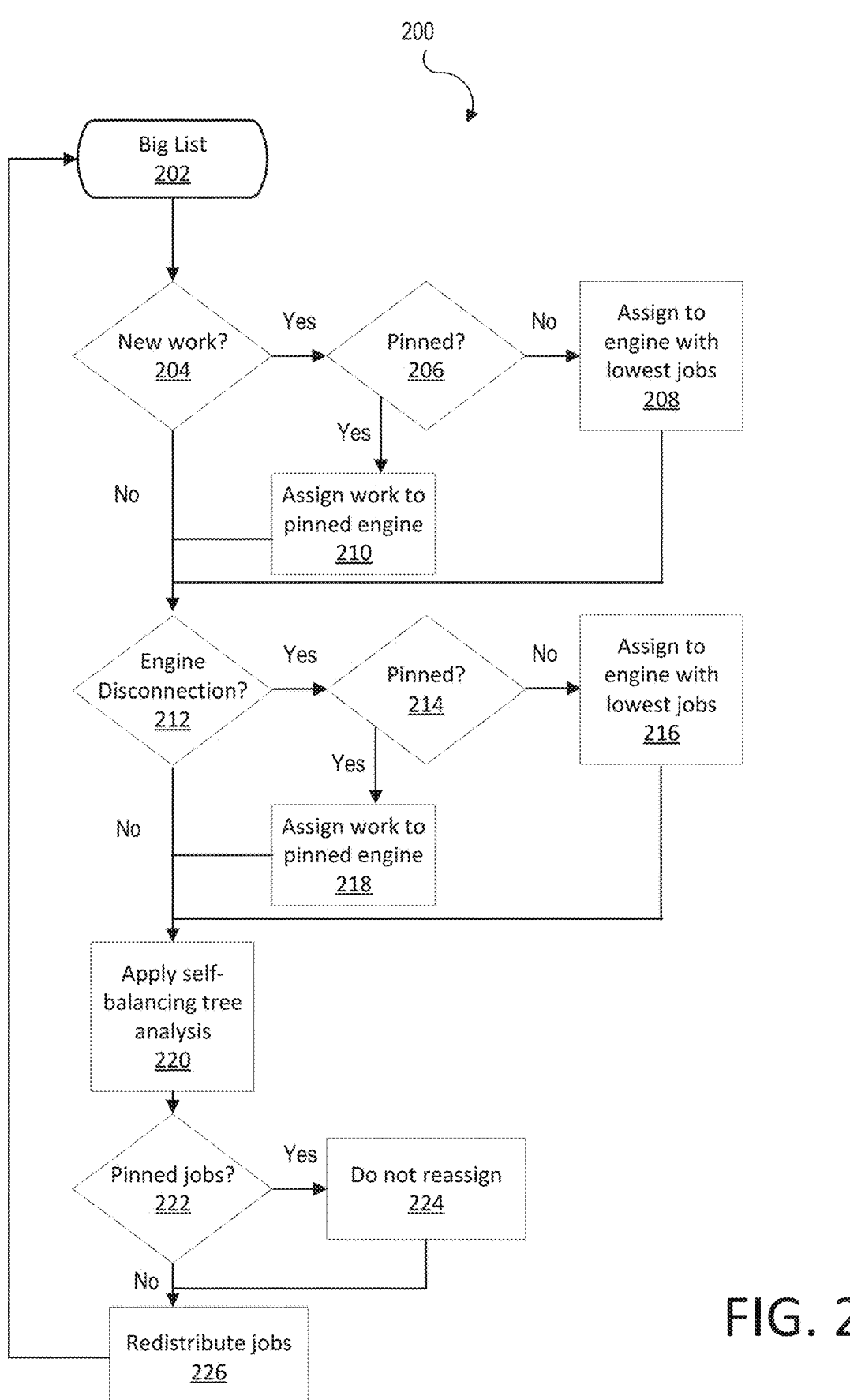
FIG. 2 is a method for performing task coordination by the application management server amongst the remote computing engines of FIG. 1.

FIG. 2 shows a method 200 for performing task coordination by the application management server amongst the engines 112a-112c of FIG. 1.

The method shown in FIG. 2 starts with a big list 202. As described above with respect to FIG. 1, big list 202 can include a list of resources, tasks, and locations for assets like engines (e.g., engines 112a-112c) and spaces (e.g., spaces 113a and 113b). With increasingly large networks and systems, such lists have increased in size; whereas they once contained hundreds or thousands of items, it is anticipated that lists containing millions or more of items will increasingly be used in RPC systems.

Big list 202 need not be distributed across multiple servers, but instead can be stored in a single memory location. Big list 202 allows a single process to store a list that is larger than can be handled in memory alone by replacing objects in third party libraries that might be dependent on available memory and with minimal modifications switch it to a disk limit.

In an RPC framework, new tasks are received frequently. At 204, the method 200 includes checking for new work. If new work is found, a check is performed to determine whether that new work is a pinned task at 206. Pinned tasks are those that must be assigned to a particular engine, a particular type of engine, a particular geographic scope, or some other criterion. Thus, pinned tasks detected at 206 are assigned to engine work lists separately from non-pinned tasks, and according to different criteria. If the task is not pinned, then at 208 it is assigned to the engine (e.g., one of engines 112a-112c) that has the lowest number of jobs currently in its queue (110). If the new task is pinned, then the new work is assigned to the associated pinned engine at 210.

Next, method 200 includes an engine disconnection check at 212. It may be the case that engines (e.g., engines 112a-112c) that were previously connected to an application management server (e.g., application management server 100 of FIG. 1) become disconnected. This could be due to the engine being reassigned to other tasks, or an engine may be offline for maintenance or a failure, or the network may be down and prevent connection to the application management server, for example. No matter the reason, if tasks had previously been assigned to an engine that is no longer connected, then those tasks should be reassigned amongst the other remaining engines.

Similar to new tasks, the tasks from a disconnected engine are first checked to determine whether they were pinned at 214. As described above, pinned tasks detected at 214 are assigned to engine work lists separately from non-pinned tasks, and according to different criteria. If not, then tasks from the disconnected engine can be assigned to whichever remaining engine has the lowest number of jobs in its queue.

Pinned tasks, as described above, may be pinned based on a number of criteria that are partially or wholly based upon factors other than the existing number of tasks assigned to a particular engine's work list. Therefore, even when the server for which a task was pinned becomes disconnected, it is possible that some other available engine may also be suitable to be pinned to the task instead. In the event that another suitable server is available, the pinned task can be reassigned to that alternative engine at 218.

In some circumstances, pinned tasks may not have an appropriate alternative engine for which they can be pinned at 218. In such circumstances, the task may not be possible to reassign at 218.

Depending upon the type of pinning, an attempt may be made to reassign a task to some other engine that does not meet the pinning criteria. For example, a task may be pinned to a type of engine that is a special purpose computing machine designed for that type of task, even though it could also be performed (albeit less efficiently or effectively) by a general purpose engine.

There may be some types of tasks that cannot be reassigned at 218. For example, if a task is pinned to engines within a particular geographical region and no engine remains online that is within that area, it may not be possible to assign the task to any queue associated with any remaining engine.

At 220, a self-balancing tree analysis is performed. In this analysis, engines that have more tasks may have some of those tasks reassigned to engines that have fewer tasks. The self-balancing tree analysis at 220 creates an output of reassignments of tasks from busier engines to those that are less busy, preventing idle time and reducing the chances that some tasks take a significantly different amount of time than others to be performed due to long queues.

The output of the self-balancing tree analysis at 220 may be modified if there are pinned jobs at 222. That is, even though a self-balancing tree of tasks may be obtained by moving some tasks from one engine to another, such reassignments will be blocked at 224 if doing so would require movement of pinned tasks away from their pinned engines. Any non-pinned tasks are redistributed at 226.

Redistribution can be particularly important when a significant amount of work has been completed by one engine, for example, such that it can be assigned jobs that would otherwise remain waiting in a queue for a different engine for a long period of time. Similarly, when additional engines are assigned to an RPC framework, redistribution can fill the queues for those resources quickly and efficiently, reducing the time it takes to get to those jobs.

After redistribution at 226, the method 200 has created an updated or revised big list 202, and the method 200 can be repeated.

In addition to the elements shown in FIG. 2, other changes in the big list 202 can be caused by, for example, tasks being cancelled or completed. When a task is completed, the queue associated with the engine that is associated with that task can be updated to clear the task.

FIG. 2 shows an ordered sequence for updating and rebalancing the big list 202. Specifically, FIG. 2 shows a check for new work at 204 conducted before a check for engine disconnection at 212 which is turn done before application of the self-balancing tree analysis at 220. In alternative embodiments, these three aspects of the method 200 could be conducted in an alternative order. For example, the self-balancing tree analysis at 220 could be conducted first, second, or third. Likewise, the check for new work at 204 could be conducted first, second, or third. Likewise, the check for engine disconnection at 212 could be conducted first, second, or third.

In addition to the elements depicted and described in FIG. 2, there could be other checks, elements, processes, or steps performed. For example, there could be a check for completed work to update the queues. Additionally or alternatively, there could be a security check associated with new work 204, which can be performed by a security scanning module (e.g., security scanning module 108 of FIG. 1).

Work balancing could be performed by some other type of logical framework instead of balancing tree, in alternative embodiments. For example, work balancing could be done by round-robin allocation of new tasks or those from disconnected engines, task partitioning, or use of load-based algorithms such as least-connection algorithms, weighted round robins, randomized load balancing, IP hashing, and adaptive load balancing algorithms.

The method 200 ensures that work is distributed according to a simple yet resource-efficient set of rules. New work is distributed to the engine with the lowest jobs load; pinned work is assigned to the engine that has been specified; rebalanced work is redistributed to keep all the engines processing work (with the exception of pinned jobs, which are not redistributed and remain with their assigned engine); and work from disconnected engines is redistributed to the remaining engines equally when an engine is disconnected.

Figure 3:
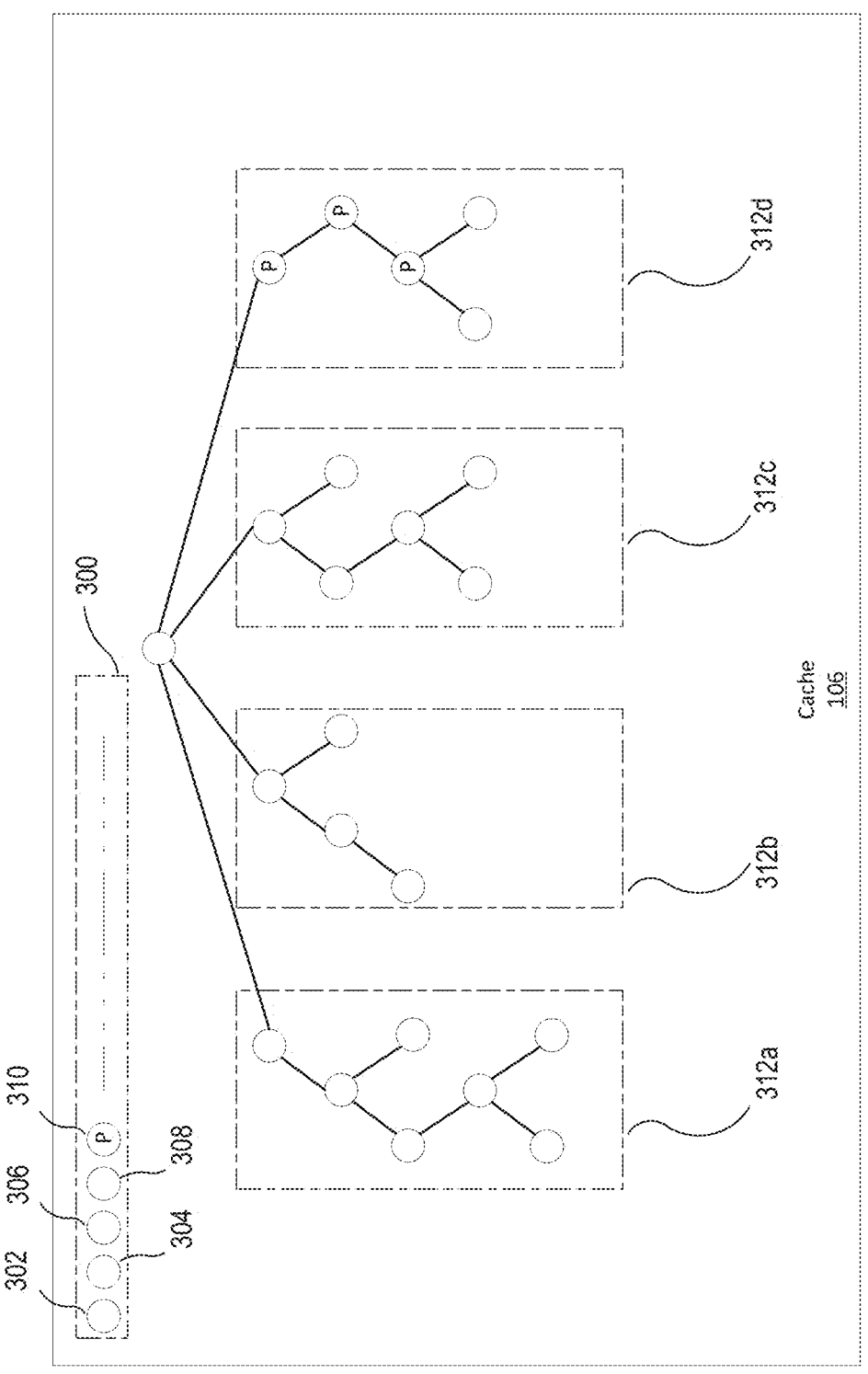
FIG. 3 is a self-balancing tree for a plurality of tasks associated with each of the set of remote computing engines of FIG. 1, as stored in the cache of the application management server of FIG. 1

FIG. 3 shows an example of the cache 106 comprising a self-balancing tree of tasks, as described with respect to element 204 of FIG. 2. The tasks are shown as lists associated with each of four engines: first engine task list 312a, second engine task list 312b, third engine task list 312c, and fourth engine task list 312d.

As tasks reach the top of the first engine task list 312a, second engine task list 312b, third engine task list 312c, or fourth engine task list 312d, an associated queue (e.g., queues 110 of FIG. 1) stored in non-volatile memory is accessed by a processor (e.g., RPC framework processor 102) and the task is delegated to the corresponding engine (e.g., engines 112a-112c of FIG. 1).

New task list 300 includes a series of tasks 302, 304, 306, 308, and 310. Of these, task 310 is a pinned task, as indicated by its "P" label.

There are different numbers of tasks associated with each of the engines. First engine task list 312a contains seven tasks, while second engine task list 312b contains four tasks, third engine task list 312c contains six tasks, and fourth engine task list 312d contains five tasks (three of which are pinned tasks).

Figure 4:
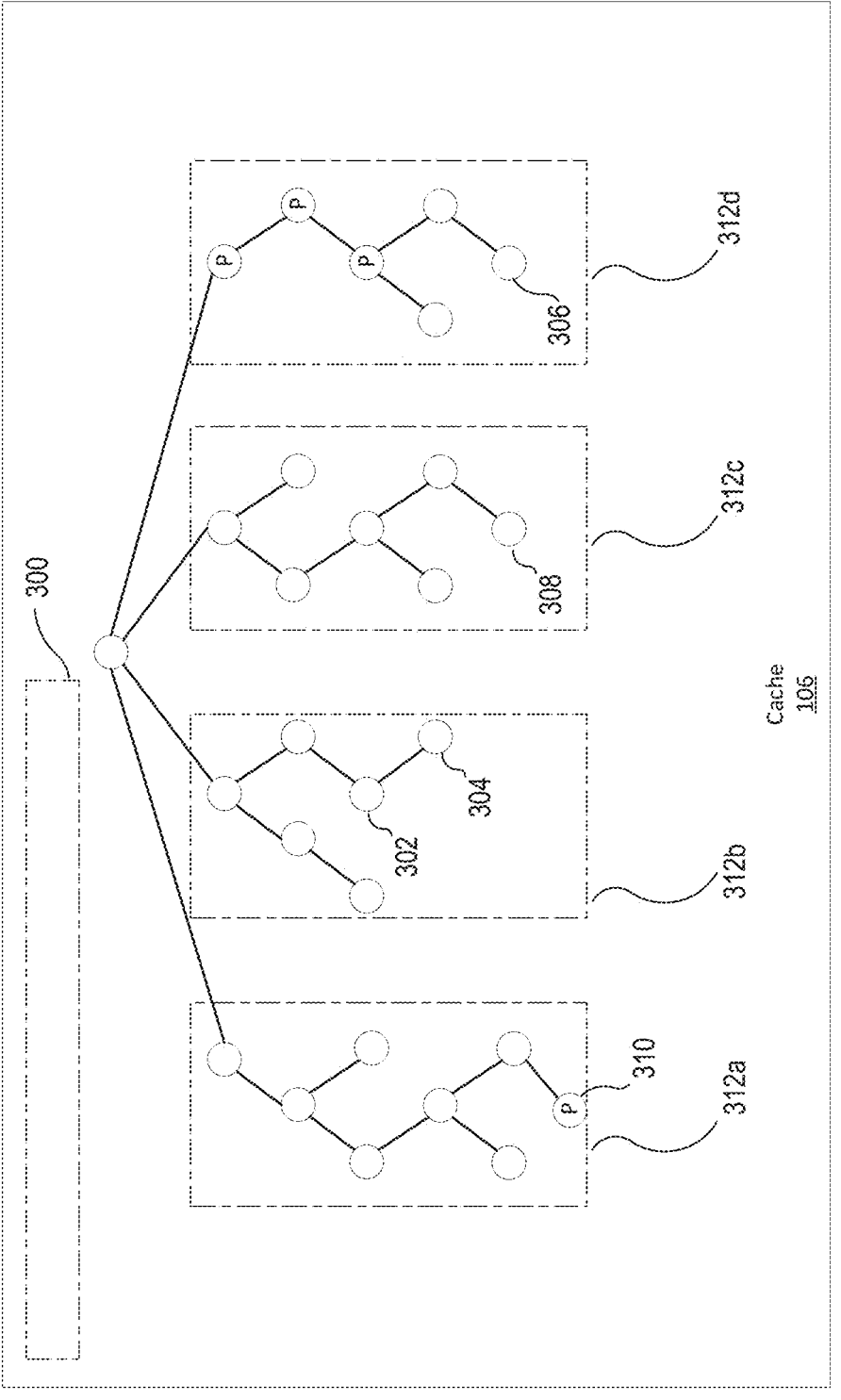
FIG. 4 is the self-balancing tree of FIG. 3, with new tasks allocated therein as described in the method shown in FIG. 2.

FIG. 4 depicts assigning new tasks. FIG. 4 shows the same tasks as those previously depicted in FIG. 3, but with new tasks from the new task list 300 allocated among the various engine task lists. The tasks are assigned to the engine task lists with the fewest existing tasks. Therefore task 302 is assigned to second task list 312b, which had the fewest tasks originally. The remaining tasks 304, 306, 308, and 310 are similarly assigned.

There are different types of self-balancing trees that can be used, such as those that are vertically balanced or those that are based solely on the number of tasks associated with each list, or weighted balancing that recognizes some jobs or tasks can take different amounts of time to complete.

Notably, in FIG. 4 the end result of task allocation has more tasks in first engine task list 312a. Task 310 was a pinned task that specified that it should be assigned to the first task list 312a. Therefore, the end result of the new task allocation is that first engine task list 312a is assigned task 310 even though it was not the engine with the fewest tasks. As shown in FIG. 4, at the end of new task allocation 204 of FIG. 2 there are eight tasks in first engine task list 312a, six tasks in second engine task list 312b, seven tasks in third engine task list 312c, and six tasks in fourth engine task list 312d.

Figure 5:
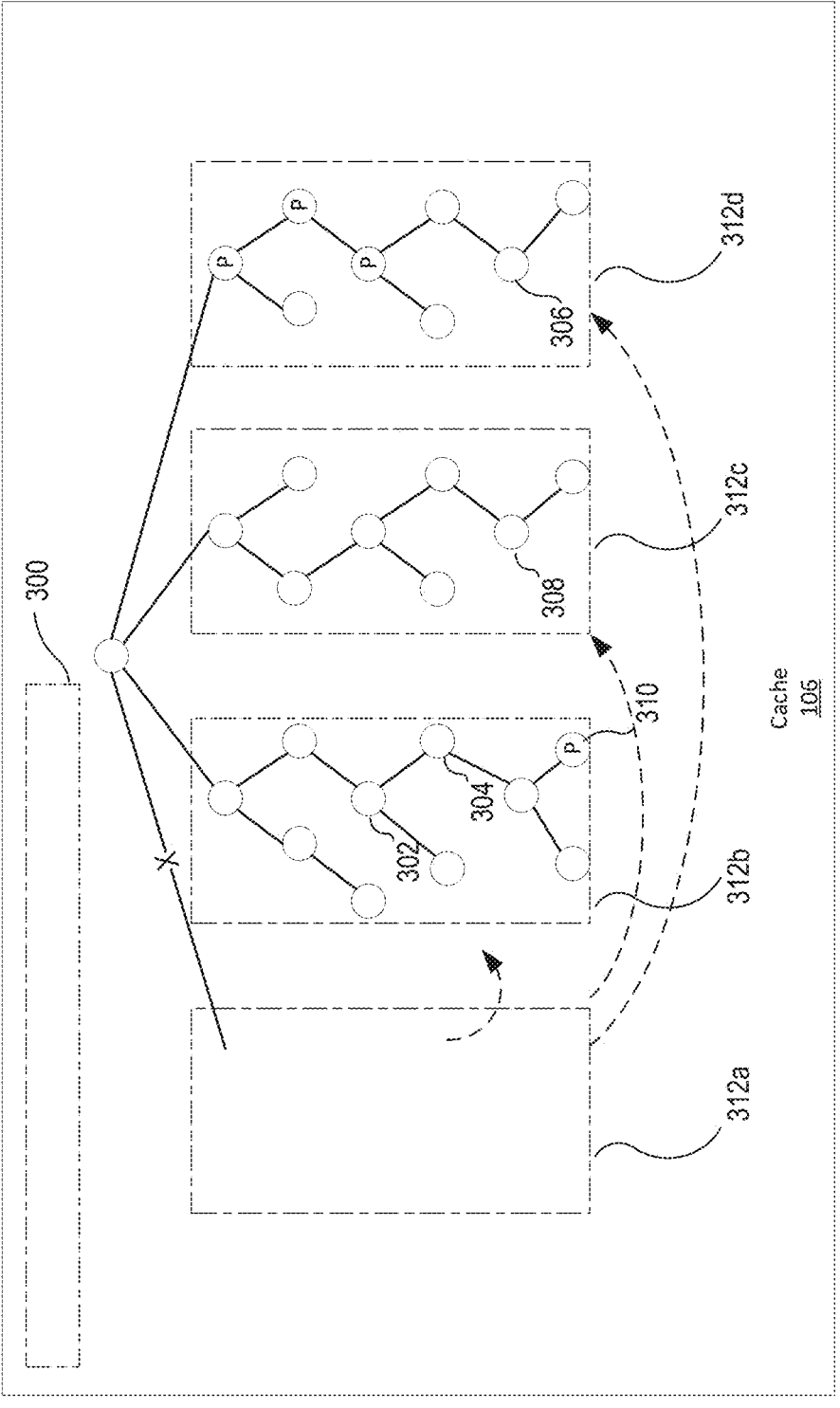
FIG. 5 is the self-balancing tree of FIG. 4, with tasks redistributed from a disconnected engine as described in the method shown in FIG. 2.

FIG. 5 depicts work reallocation in the event of an engine disconnection. The process for reallocation is described more generally above with respect to engine disconnection 212 and associated elements 214, 216, and 218 of FIG. 2.

In the example depicted in FIG. 5, the engine associated with first engine task list 312a is disconnected. The disconnection can be planned or unplanned. In response to the disconnection, tasks are reallocated from first engine task list 312a to the second, third, and fourth engine task lists 312b, 312c, and 312d, as shown by the dashed lines.

As described with respect to 214 of FIG. 2, pinned tasks are handled by assigning work to other acceptable pinned engines at 218, if available. Thus task 310, which was previously pinned to first engine task list 312a as shown in FIG. 3, is reassigned to second engine task list 312b. In the embodiment shown in FIG. 5, that is because second engine task list 312b corresponds to an acceptable alternative engine for pinning task 310. In some alternative scenarios, it may be the case that all of the remaining connected engines are equally acceptable for purposes of the pinned task, in which case task 310 can be reassigned to the engine with the fewest tasks. Determining whether and how pinned tasks can be reassigned can be handled by an RPC framework processor (e.g., RPC framework processor 102 of FIG. 1).

With pinned task 310 reallocated, the remaining tasks from first engine task list 312a can also be reassigned to the task lists associated with the remaining connected engines. As a result of this reallocation, second engine task list 312b contains ten tasks, third engine task list 312c includes eight tasks, and fourth engine task list 312d contains eight tasks.

Figure 6:
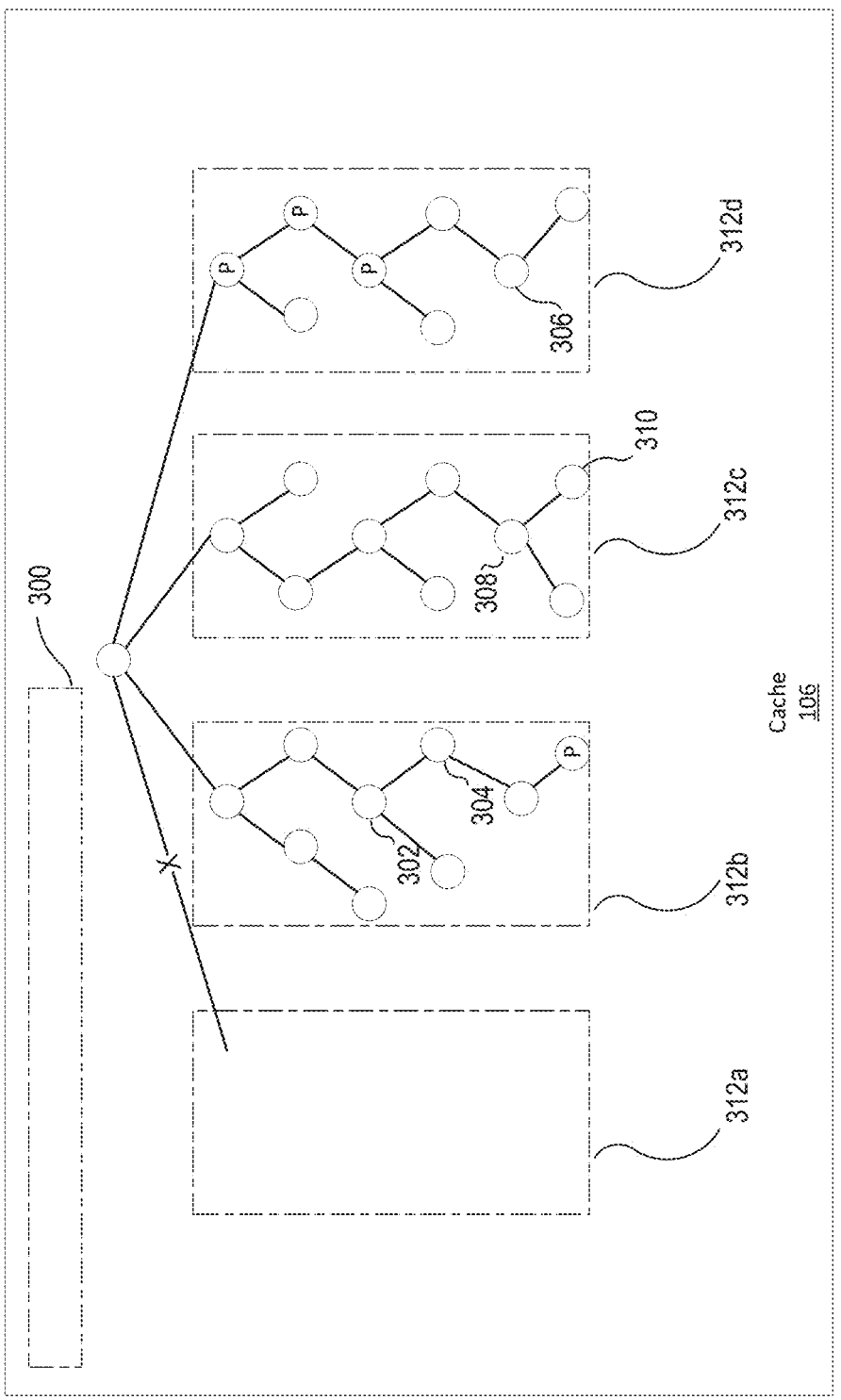
FIG. 6 is the self-balancing tree of FIG. 5, with tasks redistributed as described in the method shown in FIG. 2.

FIG. 6 shows the same tasks as those previously depicted with respect to FIG. 5, after rebalancing as described above with respect to applying self-balancing tree analysis at 220 of FIG. 2, as well as associated reallocation of pinned jobs at 222 and 224 and non-pinned jobs at 226.

Specifically, because second engine task list 312b in FIG. 5 had included more tasks than the other two task lists associated with connected engines (i.e., third engine task list 312c and fourth engine task list 312d), tasks were reallocated to better balance the workload. After reallocation, second engine task list 312b includes nine tasks, third engine task list 312c includes nine tasks, and fourth engine task list includes eight tasks.

Additional events may occur which are not depicted in the sequence from FIGS. 3 through 6. For example, tasks that are completed may be removed from an engine's associated task list. As tasks are completed, rebalancing as shown in FIG. 6 and described with respect to elements 220-226 of FIG. 2 will move tasks from one queue to another to ensure that no engine is idled while others maintain a queue.

Similarly, while the effects of the task lists for a disconnected engine are shown with respect to FIG. 5 and described with respect to FIG. 2 at elements 212-218, engines may also come back online, or new engines may be assigned to the RPC framework. In those instances, rebalancing and allocation of new jobs can fill the queues for those additional resources to reduce the processing time for tasks in a resource-efficient manner.

Referring back to FIG. 1, managing the tasks in cache 106 while accessing queues 110 only as needed is a less memory-intensive process than those used by conventional systems. The amount of memory allocated to cache 106 can be quite low by keeping queues 110 in non-volatile memory.

Figure 7:
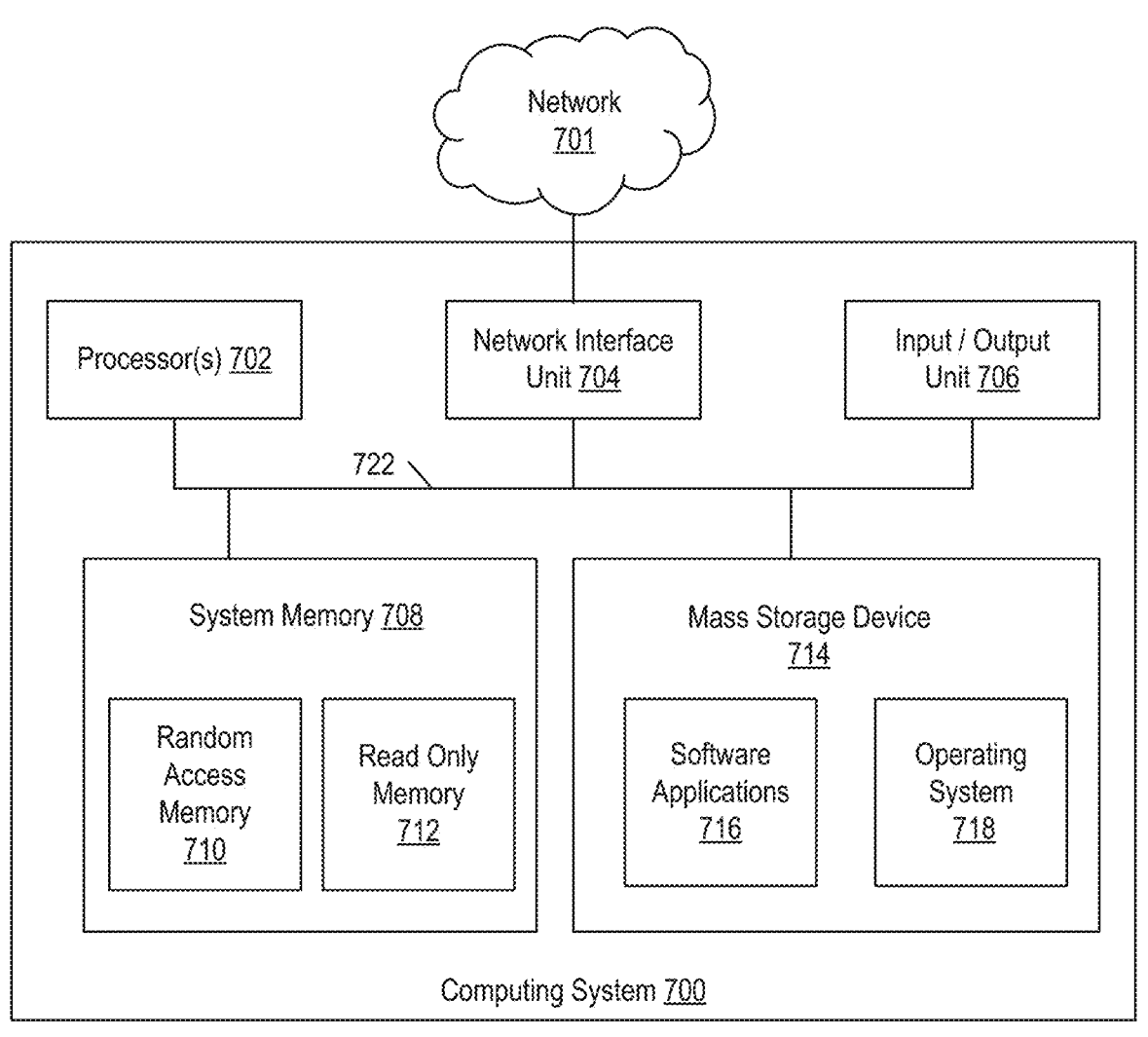
FIG. 7 illustrates an example computing system with which aspects of the present disclosure may be implemented.

FIG. 7 illustrates an example block diagram of a virtual or physical computing system 700. One or more aspects of the computing system 700 can be used to implement the processes described herein. For instance, the application management server 100 of FIG. 1 can include one or more of the components of the example computing system 700 described below. The remaining computing devices described herein can be similarly configured.

In the embodiment shown, the computing system 700 includes one or more processors 702, a system memory 708, and a system bus 722 that couples the system memory 708 to the one or more processors 702. The system memory 708 includes RAM (Random Access Memory) 710 and ROM (Read-Only Memory) 712. A basic input/output system that contains the basic routines that help to transfer information between elements within the computing system 700, such as during startup, is stored in the ROM 712. The computing system 700 further includes a mass storage device 714, corresponding to the non-volatile memory as described elsewhere in the application. The mass storage device 714 is able to store software instructions and data. The one or more processors 702 can be one or more central processing units or other processors.

The mass storage device 714 is connected to the one or more processors 702 through a mass storage controller (not shown) connected to the system bus 722. The mass storage device 714 and its associated computer-readable data storage media provide non-volatile, non-transitory storage for the computing system 700. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 700.

According to various embodiments of the invention, the computing system 700 may operate in a networked environment using logical connections to remote network devices through the network 701. The network 701 is a computer network, such as an enterprise intranet and/or the Internet. The network 701 can include a LAN, a Wide Area Network (WAN), the Internet, wireless transmission mediums, wired transmission mediums, other networks, and combinations thereof. The computing system 700 may connect to the network 701 through a network interface unit 704 connected to the system bus 722. It should be appreciated that the network interface unit 704 may also be utilized to connect to other types of networks and remote computing systems. The computing system 700 also includes an input/output controller 706 for receiving and processing input from a number of other devices, including a touch user interface display screen, or another type of input device. Similarly, the input/output controller 706 may provide output to a touch user interface display screen or other type of output device.

As mentioned briefly above, the mass storage device 714 and the RAM 710 of the computing system 700 can store software instructions and data. The software instructions include an operating system 718 suitable for controlling the operation of the computing system 700. The mass storage device 714 and/or the RAM 710 also store software instructions, that when executed by the one or more processors 702, cause one or more of the systems, devices, or components described herein to provide functionality described herein. For example, the mass storage device 714 and/or the RAM 710 can store software instructions that, when executed by the one or more processors 702, cause the computing system 700 to receive and execute managing network access control and build system processes.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For examples, while certain technologies described herein were primarily described in the context of queueing structures, technologies disclosed herein are applicable to data structures generally.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. An application management device for indexing remote data stores, the application management device comprising:

a cache comprising volatile memory and configured to store a plurality of tasks, wherein the cache is formed as a self-balancing tree construct having a predefined size that is adjustable to balance speed of processing against use of the volatile memory for computational efficiency;

a non-volatile memory configured to store a plurality of queues, each of the plurality of tasks corresponding to one of the plurality of queues; and a processor communicatively coupled to a plurality of engines, the processor configured to:

assign the plurality of tasks to a set of engine task lists, wherein each of the set of engine task lists corresponds to one of the plurality of engines;

assign each of a plurality of new tasks to one of the set of engine task lists, wherein each of the plurality of new tasks is assigned based upon which of the set of engine task lists has fewest assigned tasks;

assign each of a plurality of tasks from disconnected engines to one of the set of engine task lists, wherein each of the plurality of tasks from the disconnected engines is assigned based upon which of the set of engine task lists has fewest assigned tasks;

access the plurality of queues from the non-volatile memory when one of the plurality of new tasks reaches a top of the set of engine task lists for delegation to corresponding engines; and rebalance the plurality of tasks, the plurality of new tasks, and the plurality of tasks from the disconnected engines amongst the set of engine task lists using the self-balancing tree construct.

2. The application management device of claim 1, wherein the cache has a fixed size.

3. The application management device of claim 1, wherein the cache has a size that can be adjusted by a user.

4. The application management device of claim 1, wherein the processor is configured to:

assign the plurality of new tasks before assigning the plurality of tasks from the disconnected engines; and assign the plurality of tasks from the disconnected engines before rebalancing.

5. The application management device of claim 1, wherein the processor is further configured to assign pinned tasks amongst the set of engine task lists based separately from the plurality of tasks, the plurality of new tasks, and the plurality of tasks from the disconnected engines, and wherein the pinned tasks are assigned based on pinning criteria.

6. The application management device of claim 1, wherein the processor is further communicatively coupled to a plurality of spaces, the plurality of spaces including data for processing according to the plurality of queues.

7. A method comprising:

assigning a plurality of tasks to a set of engine task lists, wherein each of the set of engine task lists corresponds to one of a plurality of engines;

assigning each of a plurality of new tasks to one of the set of engine task lists, wherein each of the plurality of new tasks is assigned based upon which of the set of engine task lists has fewest assigned tasks;

assigning each of a plurality of tasks from disconnected engines to one of the set of engine task lists, wherein each of the plurality of tasks from the disconnected engines is assigned based upon which of the set of engine task lists has fewest assigned tasks;

accessing a plurality of queues from a non-volatile memory when one of the plurality of new tasks reaches a top of the set of engine task lists for delegation to corresponding engines; and rebalancing the plurality of tasks, the plurality of new tasks, and the plurality of tasks from the disconnected engines amongst the set of engine task lists using a self-balancing tree construct, wherein each of the plurality of tasks corresponds to a queue stored in the non-volatile memory, and wherein the plurality of tasks is stored in a cache comprising volatile memory; and wherein the cache is formed as the self-balancing tree construct having a predefined size that is adjustable to balance speed of processing against use of the volatile memory for computational efficiency.

8. The method of claim 7, wherein the cache comprises a fixed size of volatile memory.

9. The method of claim 7, wherein assigning the plurality of new tasks is performed before assigning the plurality of tasks from the disconnected engines, and assigning the plurality of tasks from the disconnected engines is performed before rebalancing.

10. The method of claim 7, wherein pinned tasks are assigned amongst the set of engine task lists separately from the plurality of tasks, the plurality of new tasks, the plurality of tasks from the disconnected engines, and the tasks being rebalanced.

11. The method of claim 10, wherein the pinned tasks are assigned based upon at least one pinning criterion that is not based upon a number of tasks assigned to each of the set of engine task lists.

12. The method of claim 7, further comprising accessing, by a processor, the plurality of queues corresponding to the plurality of tasks in an order based upon a number of tasks assigned to each of the set of engine task lists.

13. A system for indexing remote data stores, the system comprising:

a plurality of engines; and an application management device including:

a cache comprising volatile memory and configured to store a plurality of tasks, wherein the cache is formed as a self-balancing tree construct having a predefined size that is adjustable to balance speed of processing against use of the volatile memory for computational efficiency;

a non-volatile memory configured to store a plurality of queues, each of the plurality of tasks corresponding to one of the plurality of queues; and a processor communicatively coupled to the plurality of engines, the processor configured to:

assign the plurality of tasks to a set of engine task lists, wherein each of the set of engine task lists corresponds to one of the plurality of engines;

assign each of a plurality of new tasks to one of the set of engine task lists, wherein each of the plurality of new tasks is assigned based upon which of the set of engine task lists has fewest assigned tasks;

assign each of a plurality of tasks from disconnected engines to one of the set of engine task lists, wherein each of the plurality of tasks from the disconnected engines is assigned based upon which of the set of engine task lists has fewest assigned tasks;

access the plurality of queues from the non-volatile memory when one of the plurality of new tasks reaches a top of the set of engine task lists for delegation to corresponding engines; and rebalance the plurality of tasks, the plurality of new tasks, and the plurality of tasks from the disconnected engines amongst the set of engine task lists using the self-balancing tree construct.

14. The system of claim 13, further comprising a plurality of spaces communicatively coupled to the processor, each of the plurality of spaces configured to hold data corresponding to at least one of the plurality of queues.

15. The system of claim 13, wherein the cache has a fixed size.

16. The system of claim 13, wherein the cache has a size that can be adjusted by a user.

17. The system of claim 13, wherein the processor is configured to:

assign the plurality of new tasks before assigning the plurality of tasks from the disconnected engines; and assign the plurality of tasks from the disconnected engines before rebalancing.

18. The system of claim 13, wherein the processor is further configured to assign pinned tasks amongst the set of engine task lists based separately from the plurality of tasks, the plurality of new tasks, and the plurality of tasks from the disconnected engines, and wherein the pinned tasks are assigned based on pinning criteria.

* * * * *